United States Patent
Schnabel et al.

(10) Patent No.: US 8,892,234 B2
(45) Date of Patent: Nov. 18, 2014

(54) METHOD FOR CONTROLLING AT LEAST ONE MACHINING DEVICE WHICH IS COUPLED TO A MACHINE TOOL BY MEANS OF AN ENCODER SIGNAL

(75) Inventors: Holger Schnabel, Veitshoechheim (DE); Stephan Schultze, Lohr-Wombach (DE)

(73) Assignee: Robert Bosch GmbH, Stuttgart, DE (US)

( * ) Notice: Subject to any disclaimer, the term of this patent is extended or adjusted under 35 U.S.C. 154(b) by 219 days.

(21) Appl. No.: 13/164,531

(22) Filed: Jun. 20, 2011

(65) Prior Publication Data
US 2011/0313574 A1 Dec. 22, 2011

(30) Foreign Application Priority Data
Jun. 21, 2010 (DE) .......................... 10 2010 024 524

(51) Int. Cl.
| | |
|---|---|
| G05B 15/02 | (2006.01) |
| B41J 11/42 | (2006.01) |
| B41F 13/02 | (2006.01) |
| B65H 23/188 | (2006.01) |
| G05B 19/414 | (2006.01) |
| B65H 7/20 | (2006.01) |

(52) U.S. Cl.
CPC ............ *G05B 19/4141* (2013.01); *B41J 11/42* (2013.01); *B65H 2403/943* (2013.01); *B41F 13/02* (2013.01); *B65H 23/188* (2013.01); *B65H 2801/15* (2013.01); *B65H 7/20* (2013.01); *G05B 2219/45188* (2013.01)
USPC ................. 700/112; 226/10; 226/17; 700/275

(58) Field of Classification Search
CPC ................... B65H 23/188; G05B 2219/25045
USPC ............ 700/275, 13; 226/10, 17; 198/341.09
See application file for complete search history.

(56) References Cited

U.S. PATENT DOCUMENTS

| | | | | |
|---|---|---|---|---|
| 4,406,389 | A | * | 9/1983 | Mowry et al. .................... 226/29 |
| 5,391,970 | A | * | 2/1995 | Chaffee et al. ................ 318/618 |
| 6,188,341 | B1 | * | 2/2001 | Taniguchi et al. ............ 341/116 |
| 6,304,825 | B1 | * | 10/2001 | Nowak et al. .................... 702/94 |

(Continued)

FOREIGN PATENT DOCUMENTS

| | | |
|---|---|---|
| DE | 10 2006 009 773 | 9/2007 |
| DE | 10 2006 023 823 | 11/2007 |
| EP | 1 157 837 | 11/2001 |

OTHER PUBLICATIONS

Bahr, Alexander and Mutschler, Peter "Speed Acquisition Methods for High-Bandwidth Servo Drives" IEEE Industry Applications Confrence 2005 vol. 1 pp. 737-744.*

(Continued)

*Primary Examiner* — Mohammad Ali
*Assistant Examiner* — Emilio J Saavedra
(74) *Attorney, Agent, or Firm* — Maginot, Moore & Beck LLP

(57) ABSTRACT

A method is disclosed for controlling at least one machining device which is coupled to a machine tool by means of an encoder signal, the machine tool having at least one motion control device. In order to improve the accuracy of the encoder connection, at least one additional variable which characterizes the transport is digitally transmitted from the motion control device to the at least one machining device and is used to correct the encoder signal.

7 Claims, 1 Drawing Sheet

(56) References Cited

U.S. PATENT DOCUMENTS

| | | | |
|---|---|---|---|
| 6,876,896 B1* | 4/2005 | Ortiz et al. | 700/112 |
| 7,456,529 B2* | 11/2008 | Faizullabhoy et al. | 310/12.19 |
| 7,530,657 B2* | 5/2009 | Thiessen et al. | 347/16 |
| 2006/0077083 A1* | 4/2006 | Kiriyama et al. | 341/120 |
| 2007/0013334 A1* | 1/2007 | Wirtz et al. | 318/432 |
| 2008/0084171 A1* | 4/2008 | Leehey et al. | 318/34 |
| 2008/0088661 A1 | 4/2008 | Folkins et al. | |
| 2009/0153889 A1* | 6/2009 | Boness et al. | 358/1.9 |
| 2010/0023791 A1* | 1/2010 | Francescon et al. | 713/375 |
| 2010/0063625 A1* | 3/2010 | Krause et al. | 700/245 |

OTHER PUBLICATIONS

Bishop, Robert H., Mechatronic System Control, Logic, and Data Acquisition CRC Press, 2008 Chapter 15, pp. 15-4 to 15-23.*

* cited by examiner

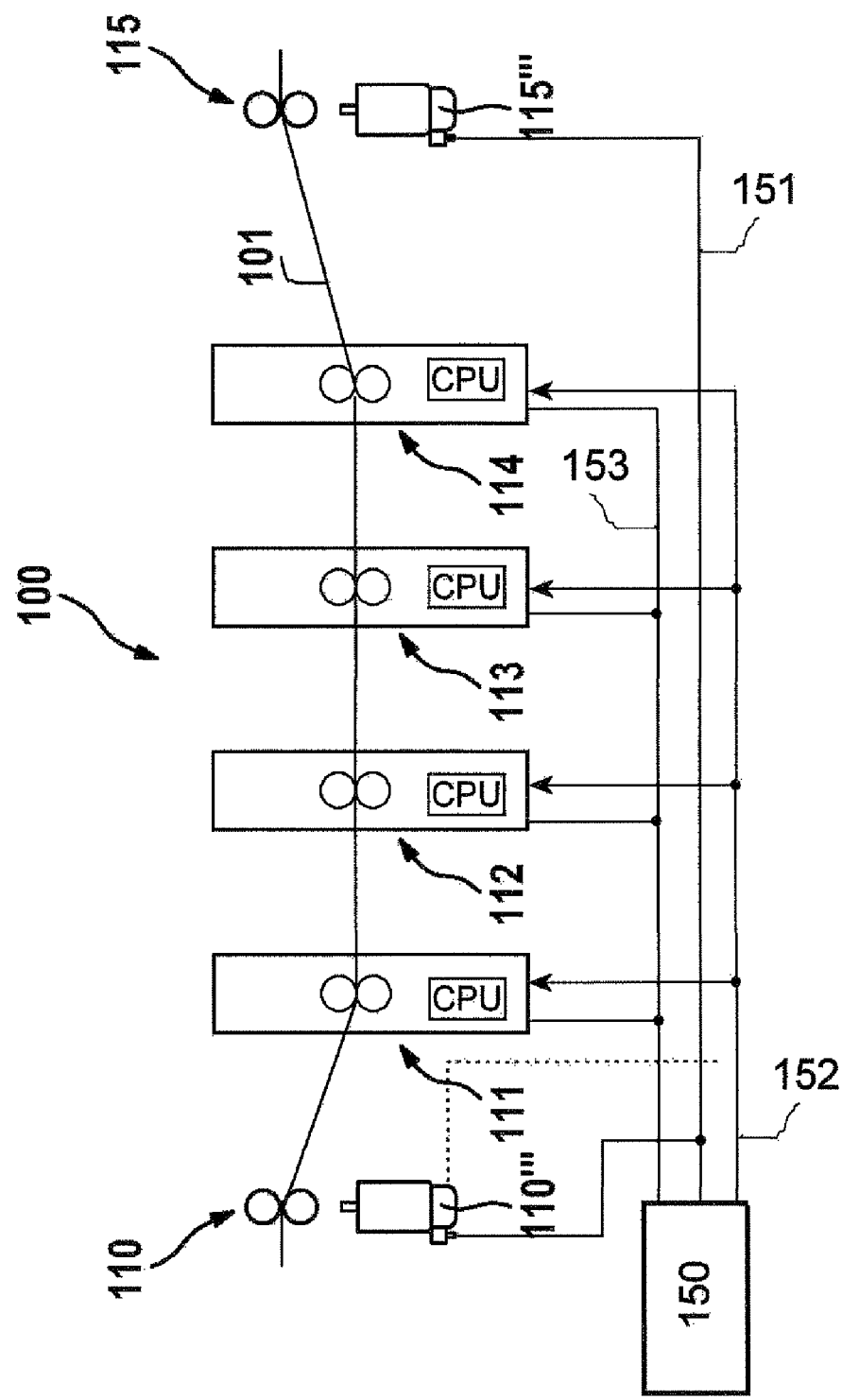

METHOD FOR CONTROLLING AT LEAST ONE MACHINING DEVICE WHICH IS COUPLED TO A MACHINE TOOL BY MEANS OF AN ENCODER SIGNAL

This application claims priority under 35 U.S.C. §119 to patent application no. DE 10 2010 024 524.0, filed Jun. 21, 2010 in Germany, the disclosure of which is incorporated herein by reference in its entirety.

BACKGROUND

The present disclosure relates to a method for controlling at least one machining device which is coupled to a machine tool by means of an encoder signal, and to a machine tool which has been set up in a corresponding manner.

Although the features of the disclosure are described substantially using digital printing units, it relates to all types of machine tools in which additional units are coupled by means of encoder information (for example by means of an encoder emulation interface of an automation system). Winder subassemblies in printing machines or packaging machines, cross-cutter subassemblies in production machines (paper processing, sheet metal working), stapler subassemblies in printing machines or bookbinding machines and transverse sealing subassemblies in packaging machines are mentioned merely by way of example.

In printing technology, use is mainly made of so-called analog printing units in which the print image is present as a complete template, for example in the form of a printing plate or a printing block. In addition, however, increasing use has recently been made of so-called digital printing units in which the print image is produced in a computation unit and is then applied to the material or to an image transfer cylinder, for example in an inkjet printing method or in an electrophotographic printing method. In digital printing methods, it is difficult, in particular, to synchronize the start and the internal raster, for example print lines, of the print image with the web transport in order to ensure maintenance of register.

Real incremental encoders or incremental encoder simulations are used for this purpose in the prior art. Digital printing units which are coupled to the web transport via incremental encoders are described, for example, in DE 10 2006 009 773 A1 or EP 1 157 837 A2.

With this type of coupling, the received encoder signal must usually be processed (filtered, converted, etc.) so that the encoder resolution matches the printing unit resolution. If a printing unit is operated at 600 dpi (dots per inch), for example, it is expedient if 600 encoder pulses are likewise available per inch of forward feed of the product web or material sheet. However, very complicated post-processing (filtering, interpolation, multiple evaluation, multiplication, etc.) of the received encoder signal is often required for this purpose.

In most cases, dead times or delay times are additionally present in the control path of the encoder signals as far as the machining unit, which times must be compensated for during encoder preprocessing in the additional unit. These times are, in particular, dead times during encoder emulation, dead times when transmitting the encoder signal, delay times caused by filtering of the (noisy) encoder signal and dead times in the additional unit from encoder evaluation to machining.

The dead times or delay times described should be taken into account since otherwise angle errors (for example register errors, cutting errors, etc.) which are dependent on the machine speed result.

In order to reduce speed-dependent errors, a speed can be formed from the (filtered) encoder signal by means of single differentiation and can be used to extrapolate the encoder position. In order to additionally reduce acceleration-dependent errors, an acceleration can be formed from the (filtered) encoder signal by means of double differentiation and can be additionally used to extrapolate the encoder position.

However, differentiation increases the noise component, and results in severe impairment of the extrapolated encoder signal, in particular in the case of double differentiation. Filtering results in a delay which cannot be completely compensated for by extrapolation either: in the case of only speed-dependent extrapolation, a dynamic angle error will form during the complete acceleration phase in acceleration processes. In the case of additional, acceleration-dependent extrapolation, a dynamic angle error will arise during the transition from a constant speed to the acceleration process.

It is therefore desirable to increase the accuracy with which a machining device is connected to the transport of the product web or material sheet by means of an encoder signal.

SUMMARY

The disclosure proposes a method for controlling at least one machining device of a machine tool and a machine tool having the features set forth herein. The following description also relates to advantageous refinements.

The disclosure uses the fact that, in modern motion control devices, the values used for correction, in particular interpolation, in the case of connection by means of an encoder signal, that is to say, in particular, speed, acceleration, jerk, etc., are available anyway and therefore can be transmitted from there to the machining device in addition to the encoder signal. Non-real-time links which are also already present can be used, in particular, for transmission, with the result that the implementation outlay remains low. The measure according to the disclosure increases the accuracy of position evaluation and improves the dynamic transition behavior during acceleration processes. According to the disclosure, at least one additional variable which characterizes the transport (additional data, for example speed, acceleration, jerk, etc.) is transmitted, in addition to the encoder signal, via a further communication link. This transmission typically takes place via a non-real-time communication system which is often present, for example in the form of an Ethernet link. The encoder signal may originate from the motion control device, a transport device and/or a machining device, as is generally known. The encoder signal can therefore comprise, in particular, a variable which characterizes the transport and/or the machining, for example a transport position.

Since the additional data are usually present in the motion control system in digital (noiseless) form, there is no need to reconstruct these data from noisy encoder data with interference. On the one hand, the noise signal is thus prevented from being increased on account of the single or double differentiation and, on the other hand, there is no need for any further filter mechanisms for the speed or acceleration values which have been determined.

Correction, in particular extrapolation, using highly accurate additional data also makes it possible to use an encoder signal with a lower incremental resolution since the "missing" encoder increments can be independently calculated in the additional unit by means of extrapolation. Simpler encoders or encoder emulations can therefore be used, which reduces costs. In principle, the zero pulse of the encoder should have a high degree of accuracy in this case. In the borderline case, only the zero pulse of the 0 track is required and all other information is extrapolated from the additional data. However, a somewhat greater degree of accuracy is obtained by evaluating the encoder inputs with A/B tracks and only carrying out the extrapolation using the additional data.

In the sense of the disclosure, it is optionally likewise possible to replace the zero pulse of the 0 track with a highly accurate trigger or synchronization signal.

Further advantages and refinements of the disclosure emerge from the description and the accompanying drawing.

It goes without saying that the abovementioned features and the features yet to be explained below can be used not only in the respectively stated combination but also in other combinations or alone without departing from the scope of the present invention.

Features of the disclosure are schematically illustrated in the drawing using an exemplary embodiment and are described in detail below with reference to the drawing.

DESCRIPTION OF THE DRAWING

FIG. 1 shows a schematic illustration of a preferred embodiment of a machine tool according to the disclosure in the form of a printing machine.

DETAILED DESCRIPTION

A preferred embodiment of a machine tool according to the disclosure in the form of a printing machine is schematically illustrated in FIG. 1 and is denoted 100 as a whole. A print material, for example paper 101, is supplied to the machine via an infeed 110. The paper 101 is passed through machining devices which are in the form of digital printing units 111, 112, 113, 114 in this case, is printed and is output again by an outfeed 115. In the example shown, the infeed and the outfeed are used to transport the print material. Alternatively or additionally, corresponding driven machining devices which machine and transport the material may be provided.

The infeed 110 has a drive 110''' and the outfeed 115 has a drive 115''', each of which is connected to a (transport) control device 150, for example a PLC, via a data link 151. In this case, the drive 110''' or 115''' comprises a motor and control electronics, for example. The data link 151 may be, in particular, in the form of a field bus link with real-time capability, for example in the form of a SERCOS III link. A master shaft position, for example, is digitally ("wavelessly") transmitted to the infeed 110 and to the outfeed 115 via the data link 151.

The digital printing units 111 to 114 may be based on an inkjet principle or may operate electrophotographically, for example. The printing units transfer the print image to the material 101 line by line, for example. In order to control the printing units 111 to 114, encoder signals are transmitted on a corresponding encoder line 152, as is known. The encoder signals may be generated—like in the present example—as an encoder emulation by the control device 150 or—as indicated by the dashed arrow—by a rotary encoder. An encoder emulation link from the control electronics of the drives 110 and 115 to the digital printing units via the encoder line is suitable as a further possible refinement. As illustrated in FIG. 1, the encoder information can generally be transmitted in a bus structure or the form of a star (not illustrated). In the latter case, a plurality of encoder signal outputs are required in the system.

Furthermore, the control device 150 is connected to the printing units 111 to 114 via a further data link 153. This may be, in particular, a conventional digital link, for example Ethernet, on which no special demands are imposed, in particular with regard to real time, and which is usually present anyway. According to one preferred embodiment of the disclosure, the values which are present in the control device 150 and relate to the web speed, the web acceleration and the web jerk are digitally transmitted via this further data link 153, with the result that these values do not have to be determined in the individual printing units by differentiating the encoder signal.

The encoder signals are evaluated without extrapolation and the additional data are used for extrapolation. The evaluation of the encoder signal is particularly expedient since said signal contains the absolute position information in a highly accurate form. For example, in the case of a incremental encoder signal with A, B and 0 tracks, the reference information regarding the absolute position within one encoder revolution is contained in the 0 track. Each of the printing units 111 to 114 has corresponding means for correcting the encoder signal using the received additional data, usually a computation unit (CPU). Interpolation can therefore be carried out in the printing unit in order to be able to carry out line-by-line digital printing in an accurate manner, for example.

A preferred correction of the position $pos_G$, determined from the encoder signal, using a speed v transmitted via the link 153 and optionally a transmitted acceleration a and optionally a transmitted jerk j is as follows:

$$pos_{Corr} = pos_G + k_v \cdot v (+ k_a^2 \cdot a)(+ k_j^3 \cdot j)$$

where $pos_{Corr}$: corrected position $k_v$, $k_a$, $k_j$: correction factors.

The correction factors can be determined, for example, using measuring runs. The dead and delay times described at the outset, in particular, are included therein. The correction is carried out in the printing unit, for which purpose the latter has a computation unit (CPU) which has been set up in a corresponding manner using programming.

In a preferred refinement, only a transmission delay $t_U$ is taken into account as the correction factor. If the transmission of the additional data has a significant propagation time $t_U$, the data have already more or less aged upon reception. If, during an acceleration phase of a shaft with an acceleration of a=100 rpm/s for example, the speed v is transmitted via the link 153 with a propagation-time-affected delay of $t_U$=100 ms, the speed value used for the correction is off the mark by 10 rpm.

With linear speed extrapolation, the following is obtained as the corrected position value $pos_{Corr}$:

$$pos_{Corr} = pos_G + t_U \cdot v$$

However, an acceleration-dependent position error remains in this case. This is typically expressed by the machining position differing during an acceleration or braking phase.

The result can be improved by additionally using a transmitted acceleration a:

$$pos_{Corr} = pos_G + t_U \cdot v + t_U^2 \cdot a$$

A further improvement can be achieved by additionally using a transmitted jerk j:

$$pos_{Corr} = pos_G + t_U \cdot v + t_U^2 \cdot a + t_U^3 \cdot j$$

So that this extrapolation optimization can be carried out, knowledge of the transmission time $t_U$ is required. Even if this cannot usually be determined in a highly accurate manner, the increase in accuracy is considerably improved even with an estimated transmission time.

What is claimed is:

1. A method for controlling at least one processing device of a processing machine, the at least one processing device being arranged along a web path, the processing machine including a web transport configured to drive a web of material along the web path past the at least one processing device and a motion control device connected to the web transport for controlling the web transport, the method comprising:
- transmitting an encoder signal to the at least one processing device via a first data link that connects the motion control device and the at least one processing device, the encoder signal indicating a reference position of the web transport;
- transmitting at least one motion characteristic value of the web transport to the at least one processing device via a second data link that connects the motion control device and the at least one processing device, the second data link being different than the first data link; and
- determining a corrected position at the at least one processing device using the reference position and the at least one motion characteristic value,
- wherein the at least one motion characteristic value includes a transport speed value,
- wherein the at least one motion characteristic value is determined at the motion control device,
- wherein the motion control device is configured to transmit the at least one motion characteristic value to the at least one processing device via the second data link,
- wherein the first data link comprises an encoder line,
- wherein the second data link comprises an Ethernet link,
- wherein the corrected position is calculated at the at least one processing device by adding a product of the transport speed value and a transmission delay value to the reference position, and
- wherein the transmission delay value is estimated or is a predetermined measured value.

2. The method of claim 1, wherein the at least one motion characteristic value further includes at least one of a transport acceleration value and a transport jerk value.

3. The method of claim 1, wherein the encoder signal is generated by a rotary encoder associated with a web transport device of the web transport, and
- wherein the rotary encoder is configured to transmit the encoder signal to the at least one processing device via the first data link.

4. The method of claim 1, wherein the encoder signal is generated by the motion control device as an encoder emulation, and
- wherein the motion control device is configured to transmit the encoder signal to the at least one processing device via the first data link.

5. The method of claim 1, wherein the at least one processing device comprises a printing unit.

6. The method of claim 1, wherein transmitting the encoder signal further comprises:
- transmitting an encoder signal to a plurality of processing devices via the first data link, the encoder signal indicating a reference position of the web transport,
- wherein transmitting at least one motion characteristic variable further comprises:
  - transmitting the at least one motion characteristic value of the web transport to the plurality of processing devices via the second data link, and
- wherein determining a corrected position further comprises:
  - determining a respective corrected position at each of the processing devices in the plurality using the reference position and the at least one motion characteristic value.

7. The method of claim 1, wherein the at least one motion characteristic value further includes a transport acceleration value and a transport jerk value.

* * * * *